(12) United States Patent
Marsac et al.

(10) Patent No.: US 7,141,738 B2
(45) Date of Patent: Nov. 28, 2006

(54) RE-ENTERABLE SPLICE ENCLOSURE

(75) Inventors: Yvonnick Marsac, Drefféac (FR); Christophe Desard, Herbignac (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/770,377

(22) Filed: Feb. 2, 2004

(65) Prior Publication Data

US 2005/0167147 A1 Aug. 4, 2005

(51) Int. Cl.
 *H02G 3/06* (2006.01)
(52) U.S. Cl. ......................................... 174/92
(58) Field of Classification Search ................. 174/92, 174/76, 138 F
 See application file for complete search history.

(56) References Cited

U.S. PATENT DOCUMENTS

| | | | |
|---|---|---|---|
| 3,183,302 A | 5/1965 | Wochner et al. | |
| 4,449,015 A | 5/1984 | Hotchkiss et al. | |
| 4,451,696 A | 5/1984 | Beinhaur | |
| 4,610,738 A | 9/1986 | Jervis | |
| 4,879,436 A | 11/1989 | Braham | |
| 5,079,300 A | 1/1992 | Dubrow et al. | |
| 5,099,088 A | 3/1992 | Usami et al. | |
| 5,310,075 A | 5/1994 | Wyler | |
| 5,397,859 A | 3/1995 | Robertson et al. | |
| 5,529,508 A | 6/1996 | Choitis et al. | |
| 5,828,005 A | 10/1998 | Huynh-Ba et al. | |
| 5,844,171 A | 12/1998 | Fitzgerald | |
| 6,010,134 A * | 1/2000 | Katoh | 277/615 |
| 6,169,250 B1 | 1/2001 | Bolcato | |
| 2002/0188059 A1 | 12/2002 | Otomo | |
| 2004/0238201 A1 * | 12/2004 | Asakura et al. | 174/92 |

FOREIGN PATENT DOCUMENTS

| | | |
|---|---|---|
| EP | 0 072 632 A1 | 2/1983 |
| EP | 0 233 417 | 8/1987 |
| EP | 0 328 386 A2 | 8/1989 |
| EP | 0 189 240 B1 | 3/1990 |
| EP | 0 409 444 A2 | 1/1991 |
| EP | 0733672 | 9/1996 |
| EP | 0 587 748 B1 | 4/1997 |
| EP | 0 728 377 B1 | 7/1998 |
| EP | 0 748 532 B1 | 7/1998 |
| EP | 0 722 624 B1 | 9/1998 |

(Continued)

OTHER PUBLICATIONS

A copy of the Search Report for International Application No. PCT/US2005/000106, mailed on Jun. 16, 2005 (7 pages).

*Primary Examiner*—Chau N. Nguyen
(74) *Attorney, Agent, or Firm*—John A. Burtis

(57) ABSTRACT

A re-enterable enclosure for a splice between cables, comprises two cover members with internal walls that are configured to form a cavity for enclosing the cable splice when the cover members are engaged with each other in a closed position. At least one of the cover members also has internal walls that are configured to define containment spaces which at least partly surround the cavity. In use, those containment spaces may contain sealant material. At least one internal wall in one cover member can telescope into a containment space in the other cover member so that, if sealant material is contained therein, it will be compressed when the cover members are engaged with each other in the closed position. By changing the containment spaces that are used to contain sealant material, different levels of protection against humidity can be provided for the cable splice in the cavity.

20 Claims, 8 Drawing Sheets

FOREIGN PATENT DOCUMENTS

| | | |
|---|---|---|
| EP | 0 731 998 B1 | 1/1999 |
| EP | 0 657 980 B1 | 4/1999 |
| EP | 0971369 | 1/2000 |
| FR | 2 770 048 | 4/1999 |
| JP | 63-280766 | 11/1988 |
| WO | WO 90/05401 | 5/1990 |
| WO | WO 92/22114 | 12/1992 |
| WO | WO 95/17756 | 6/1995 |
| WO | WO 95/33294 | 12/1995 |
| WO | WO 96/29760 | 9/1996 |
| WO | WO 97/13297 | 4/1997 |
| WO | WO 97/16869 | 5/1997 |
| WO | WO 97/27655 | 7/1997 |
| WO | WO 00/49697 | 8/2000 |
| WO | WO 02/063736 A1 | 8/2002 |

\* cited by examiner

RE-ENTERABLE SPLICE ENCLOSURE

CROSS REFERENCE OF RELATED APPLICATION

The present invention is related to U.S. patent application Ser. No. 10/770,095, titled MICROSPHERE-FILLED SEALANT MATERIALS, filed even date herewith.

FIELD

The present invention relates to an enclosure for a splice between cables, the enclosure being of the type that can be re-opened, re-enterable, to permit access to the cable splice when required and, preferably, then re-sealed. The cable may, for example, be a telecommunications cable, a power cable or an optical fibre cable.

The cable splice may, for example, be a longitudinally-extending splice (i.e. a splice between cables that extend generally from opposite directions) or a so-called "pig-tail", or butt, splice (i.e. a splice between cables that extend generally from the same direction).

BACKGROUND

A cable splice will generally require protection from the effects of the environment in which it is located and, more especially, will require protection against mechanical impact and the entry of moisture. Protection of the cables against strain will often also be required. Many different enclosures providing different levels of protection for cable splices are already available, including so-called re-enterable enclosures that can be re-opened to permit access to the splice whenever required.

Known re-enterable splice enclosures often take the form of a two-part re-openable housing that defines a cavity around the splice and contains a sealant material. The housing provides protection for the splice against mechanical impact and, in combination with the sealant material, protects the cavity to a required level against the entry of moisture while permitting access to the splice when the housing is re-opened. In some cases, the cavity is completely filled with sealant material (see, for example, the splice enclosures described in U.S. Pat. No. 6,169,250 and, in other cases, the sealant material is pre-formed by molding to particular shapes for use in cable bushings that are located at the ends of the housing (see, for example, the splice enclosures described in WO 02/063736).

SUMMARY

The present invention is concerned with providing a re-enterable splice enclosure that is capable of providing adequate protection for a cable splice against mechanical impact and the entry of moisture without requiring the cavity surrounding the splice to be filled with any suitable sealant material, and without requiring the sealant material to be pre-formed to comparatively complex shapes for use in cable bushings. The invention is, accordingly, also concerned with providing a re-enterable splice enclosure that is capable of providing adequate protection for a cable splice against mechanical impact and the entry of moisture while using a comparatively small amount of sealant material and while being comparatively simple to assemble.

The present invention provides a re-enterable enclosure for a splice between cables, the enclosure comprising two cover members with internal walls that are configured to form a cavity for enclosing the cable splice when the cover members are engaged with each other in a closed position, wherein:
   (i) at least one of the cover members has internal walls that are configured to define containment spaces, suitable for containing sealant material, that at least partly surround the cavity, and
   (ii) at least one internal wall in one cover member can telescope into a containment space in the other cover member, thereby to compress any sealant material contained therein, when the cover members are engaged with each other in the closed position.

Advantageously, at least one of the cover members comprises strain-relief members associated with cable entry paths into the cavity. The enclosure is then capable of providing the splice with protection against the effects of cable strain in addition to that provided, by the cover members, against mechanical impact and that provided, by the cover members in combination with any sealant material in the containment spaces, against the entry of moisture.

BRIEF DESCRIPTION OF THE DRAWINGS

By way of example only, splice enclosures in accordance with the invention will be described with reference to the accompanying drawings in which.

DETAILED DESCRIPTION

Figure 1:
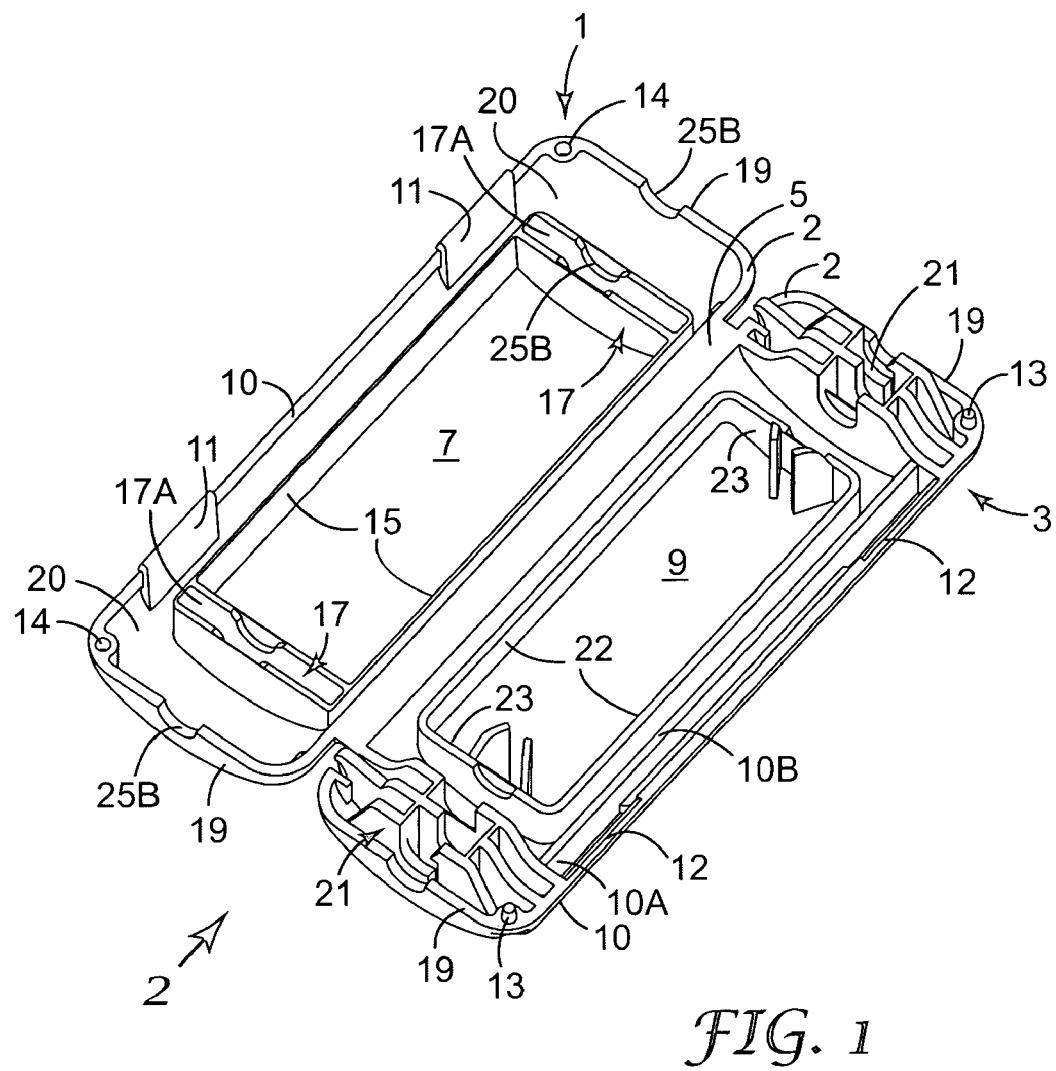
FIG. 1 is a perspective view of an exemplary splice enclosure in an open condition, showing the inside of the cover members.

FIG. 1 shows two elongate cover members 1, 3 that are used, in a manner to be described below, to form a cylindrical protective enclosure for a longitudinal cable splice (not shown). The cover members 1, 3 are molded components formed from a suitable plastics material, for example polypropylene or polyamide, and are joined together along their inner longitudinal edges 2 by a hinge 5. As illustrated, the hinge 5 is integrally-molded with the cover members 1, 3 and comprises a region of reduced thickness that defines the bending axis of the hinge. This type of hinge is well known and is often referred to as a "living" hinge.

The cover members 1, 3 both include internal walls (described in greater detail below) that define central cavity regions 7, 9 respectively. When the cover members 1, 3 are folded together about the hinge 5 and brought into engagement with each other to close the splice enclosure, the cavity regions 7, 9 together form a central enclosed cavity for containing the cable splice that is to be protected. To hold the cover members 1, 3 together in the closed position, latching tabs 11 project upwards from inside the outer longitudinal edge 10 of the upper cover member 1 so that they will slide into a latching space 10A behind the outer longitudinal edge 10 of the lower cover member 3 and engage in respective recesses 12. In addition, to reduce the possibility of any relative movement between the cover members 1, 3 once they are in the closed position, the lower cover member 3 is provided with pins 13 that engage in apertures 14 in the upper cover member 1. In that way, the stress placed on the hinge 5 when the splice enclosure is in use is limited and the risk that the latching tabs 11 will inadvertently disengage from the openings 12 is minimized.

The cavity region 7 in the upper cover member 1 is defined between side walls 15 and double end walls 17 that stand up from the internal surface of the cover member. The side walls 15 are located slightly inside the inner and outer longitudinal edges 2, 10 of the cover member, and extend parallel thereto. The double end walls 17 extend between the ends of the side walls 15 and are arranged at a distance from the respective ends 19 of the cover member 1, thereby creating a space 20 at each end of the upper cover member: each of those spaces 20 is intended, when the splice enclosure is in use, to accommodate a respective upstanding cable strain-relief structure 21 formed at the corresponding end of the lower cover member 3. The strain-relief structures 21 will be described below. The space 17A between the two walls of each double end wall 17 provides a containment space for sealant material, also described below.

The cavity region 9 in the lower cover member 3 is defined between side walls 22 and end walls 23 that stand up from the internal surface of the cover member. The side walls 22 are located slightly inside the inner longitudinal edge 2 of the cover member and the inner wall 10B of the latching space 10A, and extend parallel thereto. The end walls 23 extend between the ends of the side walls 22 and each is arranged at a distance from the respective strain-relief structure 21. The spaces that are thus formed around the cavity region 9, on the outside of the side and end walls 22, 23, provide containment spaces for sealant material as will be described below.

The side walls 15 and the double end wall 17 of the cavity region 7 in the upper cover member 1 stand up above the level of the outer edge of the cover member and are positioned so that, when the cover members 1, 3 are folded together into the closed position, the walls 15, 17 will telescope into the containment space around the cavity region 9 in the lower cover member 3.

The cable entry paths into the splice enclosure are further defined by semi-circular recesses 25B in the end walls of the cover member 1 and the end wall 17 of the cavity region 7.

Figure 3:
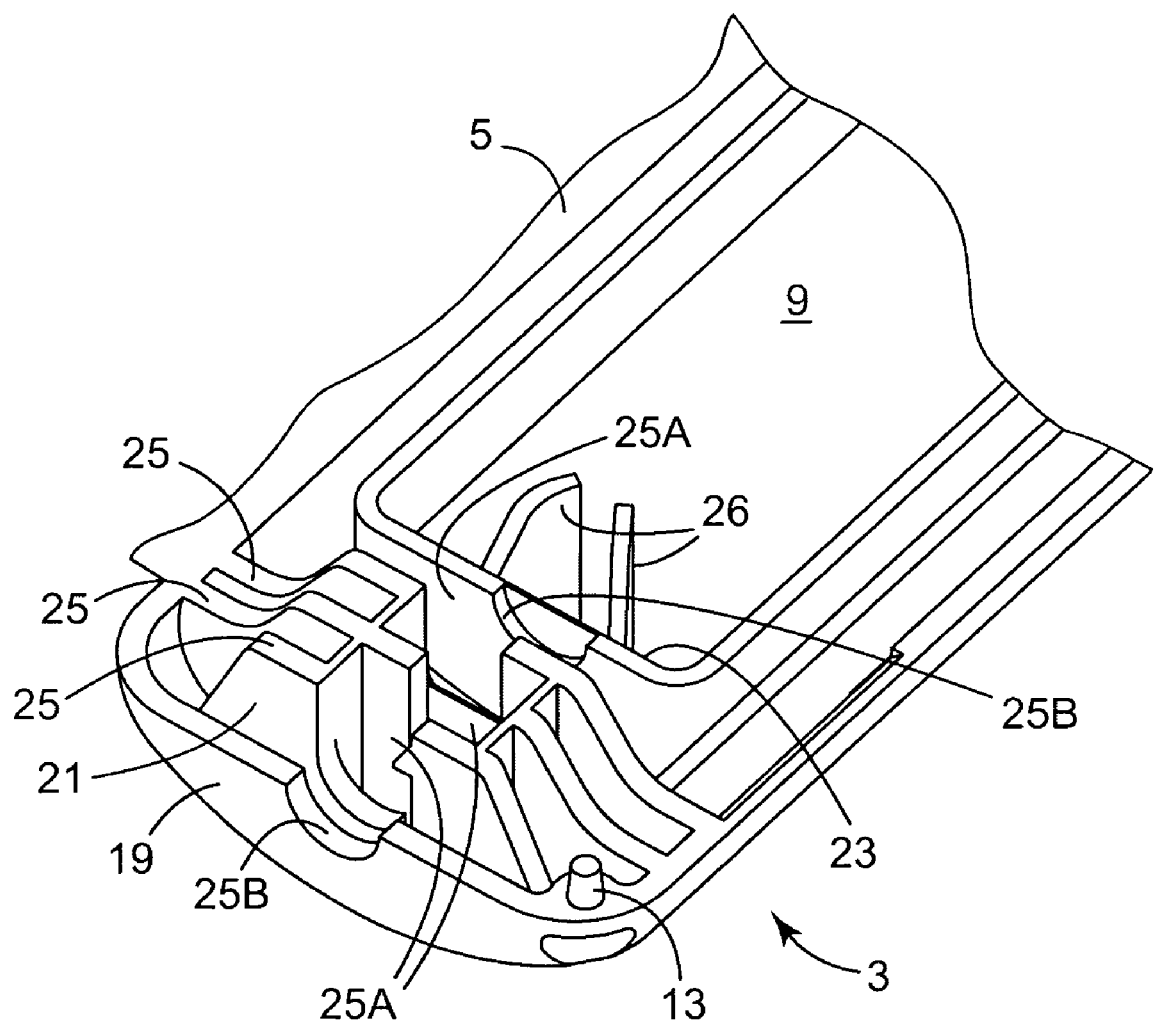
FIG. 3 is an enlarged view of one end of one of the cover members of FIG. 1.

Referring now to FIG. 3, which is an enlarged view of one end of the lower cover member 3, it can be seen that each strain-relief structure 21 comprises three spaced walls 25, arranged parallel to the adjacent end 19 of the lower cover member 3. The walls 25 contain cable openings 25A that are offset relative to each other to define a convoluted cable entry path into the splice enclosure. The cable entry paths into the splice enclosure are further defined by semi-circular recesses 25B in the end walls of the cover member 3 and the end wall 23 of the cavity region 9. Associated with the recess 25B in the end walls 23 are optional surfaces 26 for guiding a cable into the cavity region 9 and providing additional strain relief, if required.

The splice enclosure comprising the cover members 1, 3 can be used without the addition of any sealant material (i.e. in the form shown in FIG. 1 and FIG. 3) to provide a basic level of protection against humidity for a longitudinal splice between two cables, in addition to protection against mechanical impact and cable strain. The cable splice is first prepared, and the cables are then placed on the lower cover member 3 with the splice itself positioned in the cavity region 9 and the cables extending out of opposite ends of the cover member along the paths defined by the openings 25A in the strain relief structures 21, and the recesses 25B in the walls 19, 17 and 23. The upper cover member 1 is then folded down onto the lower cover member 3, around the hinge 5, and latched in the closed position. The cable splice is now protected against mechanical impact and, to a basic level, against humidity by the cover members 1, 3 but is nevertheless readily accessible simply by unlatching the upper cover member and moving it to the open position. The convoluted cable paths defined by the openings 25A provide strain relief for the cables, and ensure the integrity of the splice.

Figure 4:
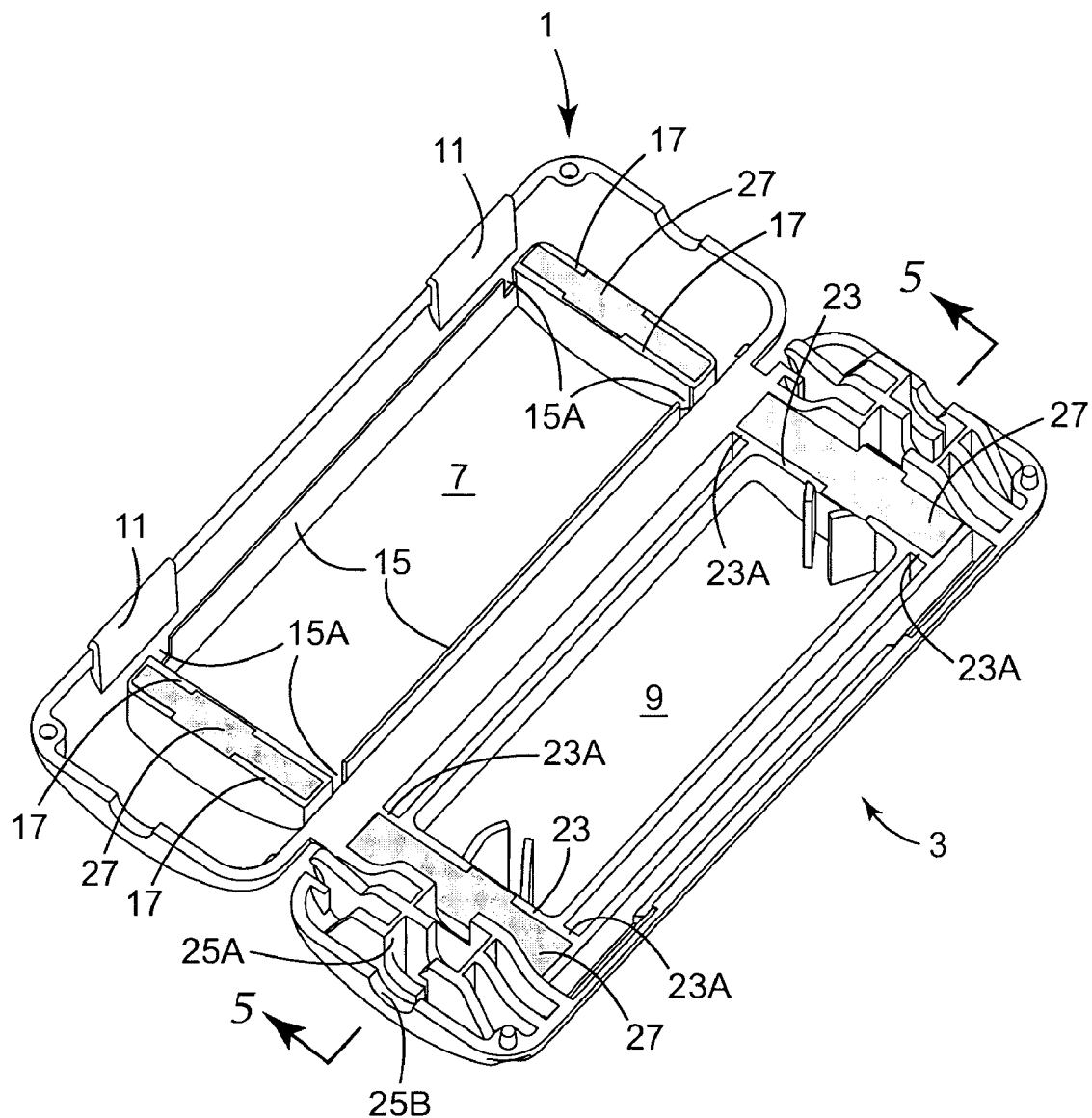
FIG. 4 is similar to FIG. 1 but shows another exemplary splice enclosure with sealant material contained in the cover members.

Referring to FIG. 4, if the cable splice requires a higher level of protection against humidity, sealant material 27 is provided in the containment spaces at the ends of the cavity regions 7, 9. To ensure, in the case of the cavity region 9, that the sealant material 27 is retained within the containment spaces at the ends of the cavity (and does not enter the containment spaces at the sides), the walls 23 of lower cover member 3 are extended outwards at each end to provide barriers 23A. As a consequence, recesses 15A are cut in the tops of the walls 15 of the upper cover member 1 to accommodate the tops of the barriers 23A when the splice enclosure is closed.

Figure 5:
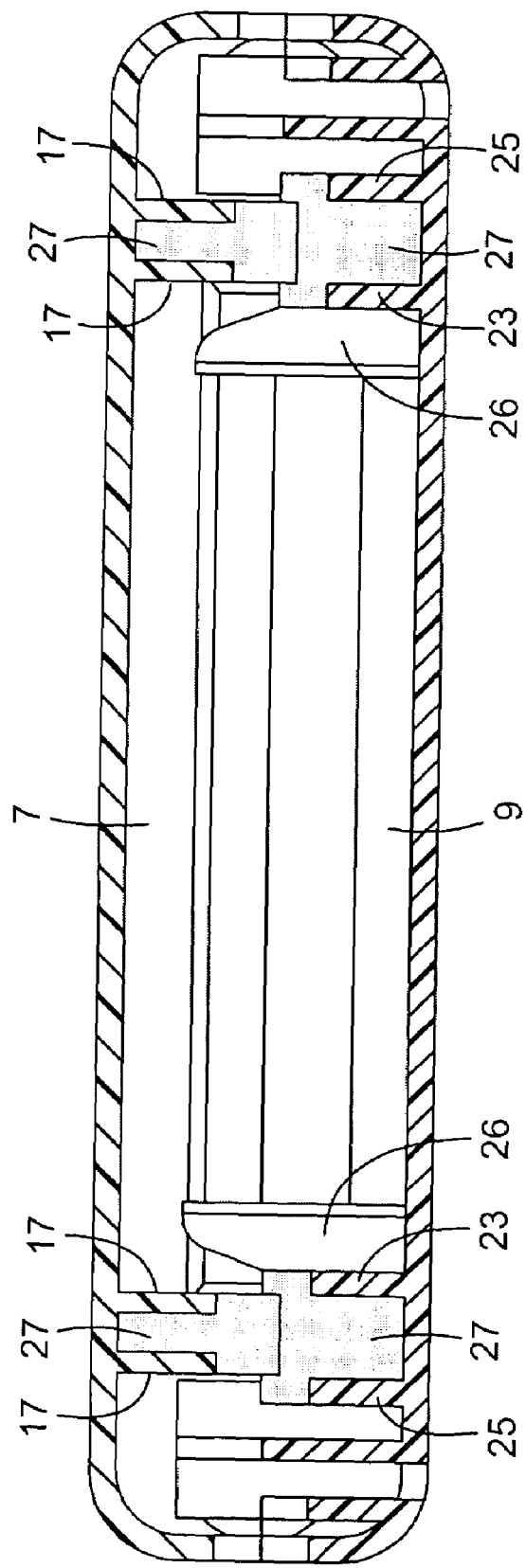
FIG. 5 shows a longitudinal cross-section taken along line 5—5 of the splice enclosure of FIG. 4 in a closed condition.

The cable splice is then prepared and the cables are placed on the lower cover member 3 as described above and as illustrated in FIG. 6, which shows the enclosure of FIG. 4 in the process of being used to protect a longitudinal splice between two cables 28. The cables are shown as comprising two pairs of wires 28A (although that is not essential) and they are positioned on the lower cover member 3 so that the connections 28B between the individual wires 28A of one cable and those of the other cable are located within the cavity region 9 with the cables 28 extending from opposite ends thereof, along the paths defined by the openings 25A in the strain relief structures 21, and the recesses 25B in the walls 19, and 23. The splice enclosure is then closed as described above, whereupon the tops of the barriers 23A in the lower cover member 3 locate in the respective recesses 15A in the upper cover member 1. At the same time, the double walls 17 at the ends of the cavity region 7 (with the sealant material 27 between them) will telescope into the sealant material 27 at the ends of the cavity region 9 as illustrated in FIG. 5, which shows a central longitudinal cross-section of the splice enclosure from which the cables have been omitted for clarity. As a result, the sealant material 27 at both ends of the inner cavity of the splice enclosure is compressed and brought into effective sealing contact with the cables and the adjacent surfaces of the cover members. Depending on its nature, the sealant material may also tend to flow out of the containment spaces and along the outside of the cables to a limited extent, thereby enhancing the sealing effect. The cable splice is now protected to a higher level against humidity and, as before, against mechanical impact and cable strain but is still readily accessible simply by unlatching the upper cover member and moving it to the open position.

The sealant material 27 for the enclosure of FIG. 4 may be provided in the form of pre-shaped pieces of gel that are located in the containment spaces at the ends of the cavity regions 7, 9. Alternatively, the sealant material may be provided in liquid form, in which case it is poured into the containment spaces and cured there to a gel-like consistency before use. Any tendency for the liquid sealant material to overflow from the containment spaces through the adjacent recesses 25A, 25B can be limited by using a high viscosity sealant material with a short curing time.

Figure 7:
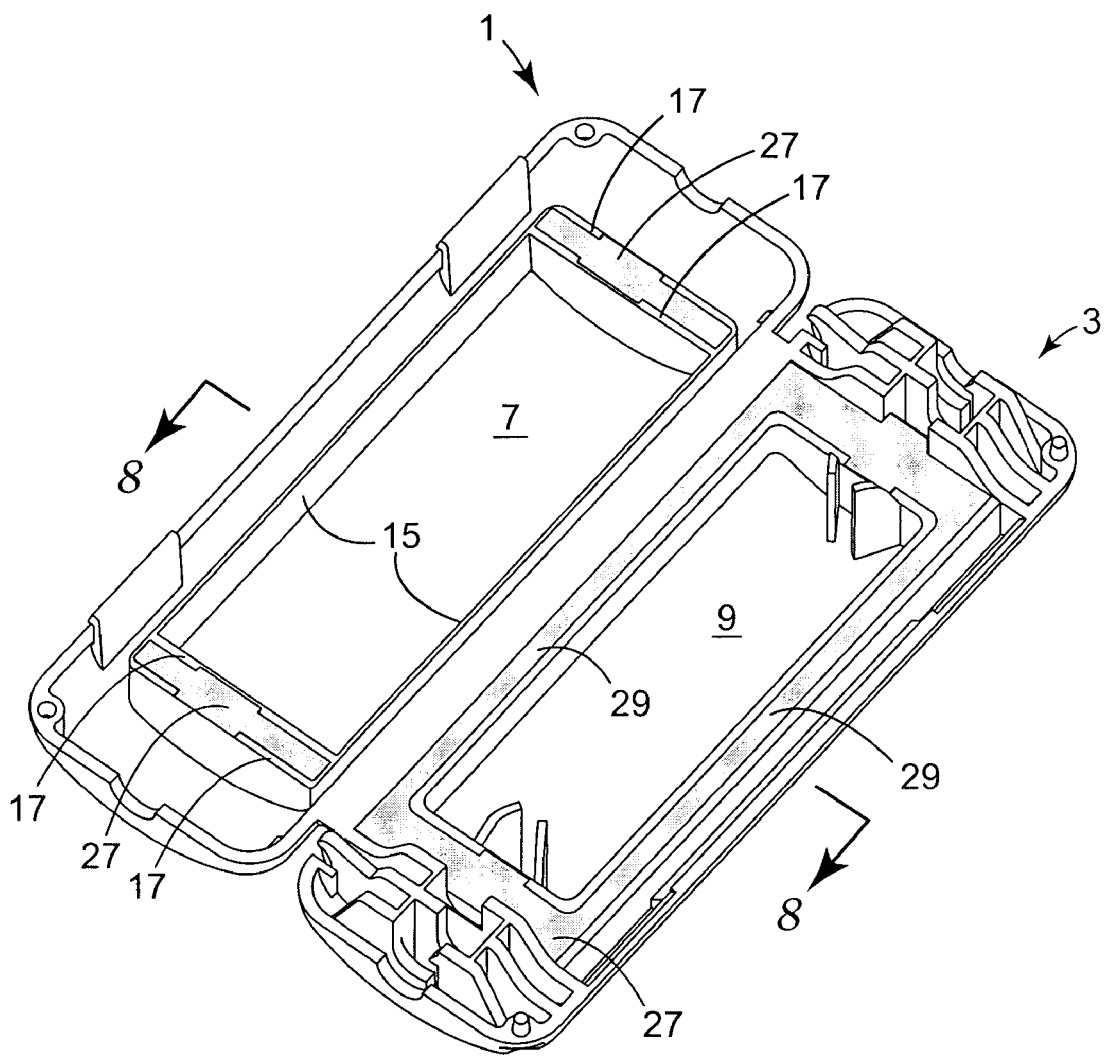
FIG. 7 is similar to FIG. 1 and shows sealant material contained in the cover members.
Figure 8:
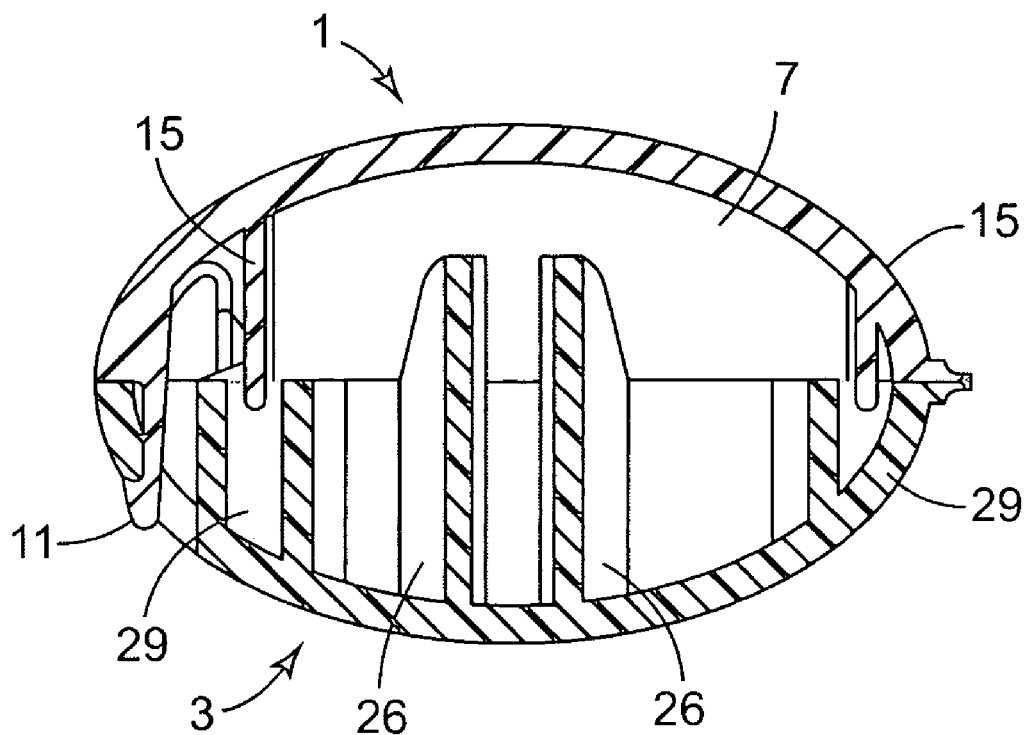
FIG. 8 is a cross-sectional view of the splice enclosure of FIG. 7 in the direction of the arrow 8—8.

Referring to FIG. 7, if the cable splice requires an even higher level of protection against humidity, additional sealant material 29 is also provided in the containment spaces along the sides of the cavity region 9 before the spliced cables are placed on the lower cover member 3 as described above. In this case, the barrier 23A and associated recesses 15A of FIG. 4 are not required and can be omitted. The splice enclosure is then closed as described above, whereupon the side walls 15 of the cavity region 7 as well as the double end walls 17 (with the sealant material 27 between them) will telescope into the sealant material 29, 27 at, respectively, the sides and the ends of the cavity region 9 as illustrated in the cross-sectional views of FIGS. 5 and 8. As a result, the inner cavity of the splice enclosure is surrounded by compressed sealant material and the cable splice is protected to an even higher level against humidity (and, as before, against mechanical impact and cable strain) but is still readily accessible simply by unlatching the upper cover member and moving it to the open position.

As described above, the sealant material 27, 29 for the enclosure of FIG. 7 may be provided in the form of pre-shaped pieces of gel that are located in the containment spaces at the ends of the cavity region 7, and at the ends and sides of the cavity region 9. Alternatively, the sealant material may be provided in liquid form, in which case it is poured into the containment spaces and cured there to a gel-like consistency before use.

A particular advantage of the splice enclosures comprising cover members 1, 3 as described above is that one type of enclosure can be used to provide several levels of protection against humidity simply by the inclusion of sealant material at appropriate locations within the cover members. Indeed, the splice enclosure illustrated in FIG. 4 can be used to provide the three different levels of protection illustrated in FIGS. 1, 4 and 7 despite the fact that the barriers 23A are not required in every case. For each level of humidity protection, effective protection for the splice against mechanical impact and cable strain is also provided.

The splice enclosures are of simple construction, and use comparatively few components so that they are easy to assemble in the field, even at difficult or inaccessible locations.

The modification required to change the level of protection (i.e. the addition of sealant material) can be easily carried out by the manufacturer or installer, particularly when a liquid sealant material is used because there is then no need to stock pieces of gel that are preformed to a particular shape. The maximum amount of sealant material (FIG. 7) need be used only when absolutely necessary and is still less than that used in, for example, re-enterable splice enclosures in which the whole of the splice cavity is filled with sealant material. Consequently, the costs of splice enclosures comprising cover members 1, 3 as described above can be lower than those in which the whole of the splice cavity is filled with sealant material. In addition, the fact that the cavity regions 7, 9 are empty allows a greater number of splices to be accommodated within a single enclosure; provides better environmental conditions in which to locate the splice(s) long-term; and simplifies access to the splice(s) in the event of the enclosure being re-opened.

Because only one sealant material is used in the splice enclosures shown in FIGS. 4 and 7 of the drawings, there are no sealing problems associated with interfaces between different sealing materials (for example, at the junction of the sealant materials 27, 29 in FIG. 7 or at the junction between the sealant materials 27 in the upper and lower cover members 1, 3). Moreover, the particular construction of the splice enclosure (which, as described, causes the double end walls 17 in the upper cover member 1, and the sealant material 27 contained therein, to telescope into the sealant material 27 in the lower cover member 3 when the enclosure is closed) ensures that the cables 28 are entirely surrounded by the sealant material 27 in the region immediately outside the central cavity 7, 9 of the enclosure. The possibility of air gaps around the cables at these locations, which could occur if the sealant material 27 in the upper cover member 1 were simply in face-to-face contact with the sealant material 27 in the lower cover member and which, if present, could allow moisture to enter the central cavity 7, 9, is thus eliminated.

Preferably, the sealant material 27, 29 has sufficient long-term resilience to ensure, once it has been compressed by closing the cover members 1, 3, that effective sealing is maintained until the splice enclosure is re-opened. Advantageously, the sealant material permits the splice enclosure then to be re-sealed (and, if required, opened and re-sealed again several times) and to continue to provide the same level of protection for the cable splice. A suitable sealant material is described in our co-pending patent application Ser. No. 10/770,095 of even date entitled "MICROSPHERE-FILLED SEALANT MATERIALS", and which is incorporated herein by reference. If required, however, one or more external resilient members can be positioned in known manner at suitable locations in the cover members 1, 3 to apply the required compressive force to the sealant material when the splice enclosure is closed.

Figure 2:
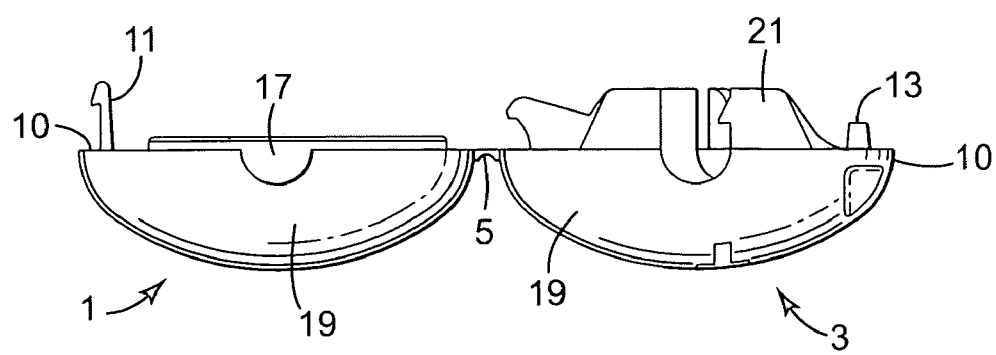
FIG. 2 is an end view of the splice enclosure of FIG. 1 in the direction of the arrow II.
Figure 9:
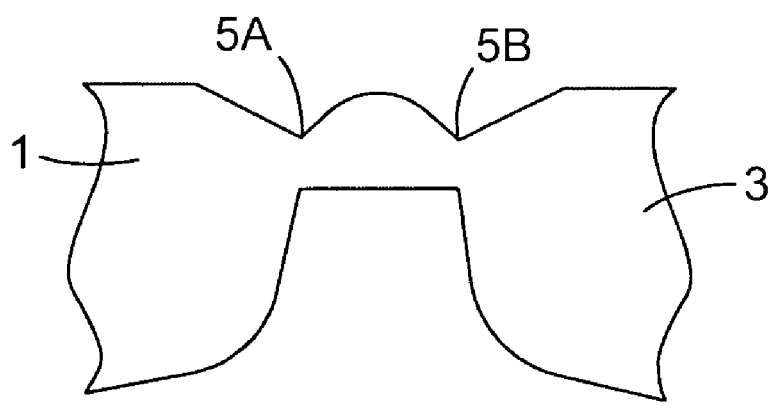
FIG. 9 is an end view on an enlarged scale of part of a splice enclosure, illustrating a modified hinge.

It will be appreciated that various modifications could be made to the construction of the cover members 1, 3 without affecting the protective function of the splice enclosure. In one modification, the single hinge 5 between the two cover members 1, 3 is replaced by two hinges 5A, 5B as illustrated in FIG. 9. That modification enables the splice enclosure to be closed by moving each cover member through only 90° relative to the adjacent hinge, thereby reducing the strain placed on each hinge. When a single hinge 5 is employed, as shown in FIG. 2, it is not essential for the hinge to be integrally-molded with the cover members; as an alternative it could be a separate component in the form, for example, of a film or a tape that is insert molded or attached by adhesive. It is also possible to modify the form, location and number of the latches 11, 12 that are used to hold the cover members together in the closed position.

Figure 10:
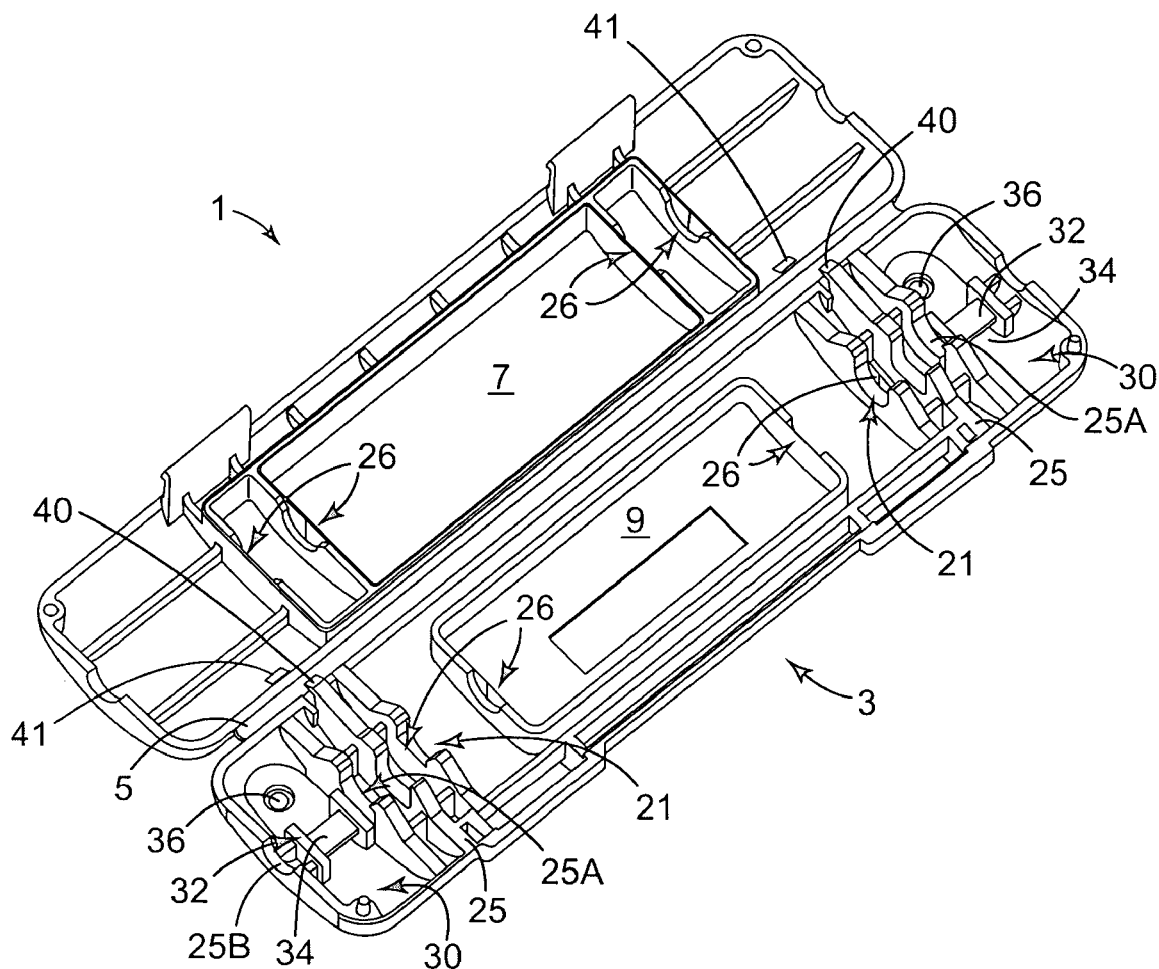
FIG. 10 is a perspective view of yet another splice enclosure in an open condition, showing the inside of the cover members.

The provision of the strain-relief structures 21 in the splice enclosure, although convenient, will limit the size of cable with which the splice enclosure can be used. For use with larger-diameter cables, the strain-relief structures 21 can be omitted and conventional cable ties used instead. Alternatively, the strain-relief structures 21 can be designed to accommodate the largest-diameter cables with which the splice enclosure is intended to be used, and some additional mechanism can be provided to enable the enclosure to be used with smaller-diameter cables. FIG. 10, for example, shows a splice enclosure in which each of the strain-relief structures 21 is designed to accommodate a five-pair cable, and the cover member 3 is extended at each end to provide compartments 30 in which smaller diameter cables (for example, two-pair cables) can be secured using conventional cable ties. For that purpose, each compartment 30 is provided with a seat 32 that is aligned with the cable opening 25A of the adjacent strain-relief structure 21 and provides support for a cable that enters the splice enclosure. If the cable is too small to be secured adequately by the strain-relief structure 21, it can be secured to the seat 32 by a cable tie (not shown) that is passed around the cable and the seat through an aperture 34 in the cover member 3.

With the benefit of the teachings of this patent, one of skill in the art could apply the present invention to any size cable or any desired pair count.

In the splice enclosure shown in FIG. 10, the cover member 1 is also extended at each end to the same extent as the cover member 3 so that the compartments 30 containing the seats 32 will be closed when the cover members 1, 3 are closed around a cable splice. In a modified version, the cable seats 32 can simply be provided as extensions of the cover member and remain exposed when the splice enclosure is closed.

FIG. 10 also shows a further modification of the splice enclosure, in the form of two areas of weakness 36 in the cover member 3 (one within each of the compartments 30) that can be pierced by screws to enable the enclosure to be secured to a flat surface if required. As a further alternative, locations for screws can be provided in extensions of the cover member 3 so that they remain exposed and accessible when the splice enclosure is closed.

FIG. 10 further illustrates that the cable openings/recesses 25A, 25B in the walls of the containment spaces at the ends of the cavity regions 7, 9 are all closed by breakable wall portions 26 prior to use of the splice enclosure. Those wall portions 26 allow liquid sealant material to be poured into the containment spaces up to the level of the top of the walls and retained during curing. Thereafter, because the wall portions 26 are breakable, they will be removed by the action of putting a cable in place in the associated openings/recesses 25A, 25B thereby enabling the cable to be effectively embedded in the sealant material. Similar breakable wall portions could be employed in any of the other splice enclosures described above with reference to the drawings.

FIG. 10 also shows the provision of a raised continuation 40 adjacent the hinge 5 on the middle wall 25 of each of the strain-relief structures 21. Each of the raised continuations 40 is engageable in a respective aperture 41 on the other side of the hinge in the cover member 1, to provide additional protection for the hinge when the cover members 1, 3 are closed.

Figure 6:
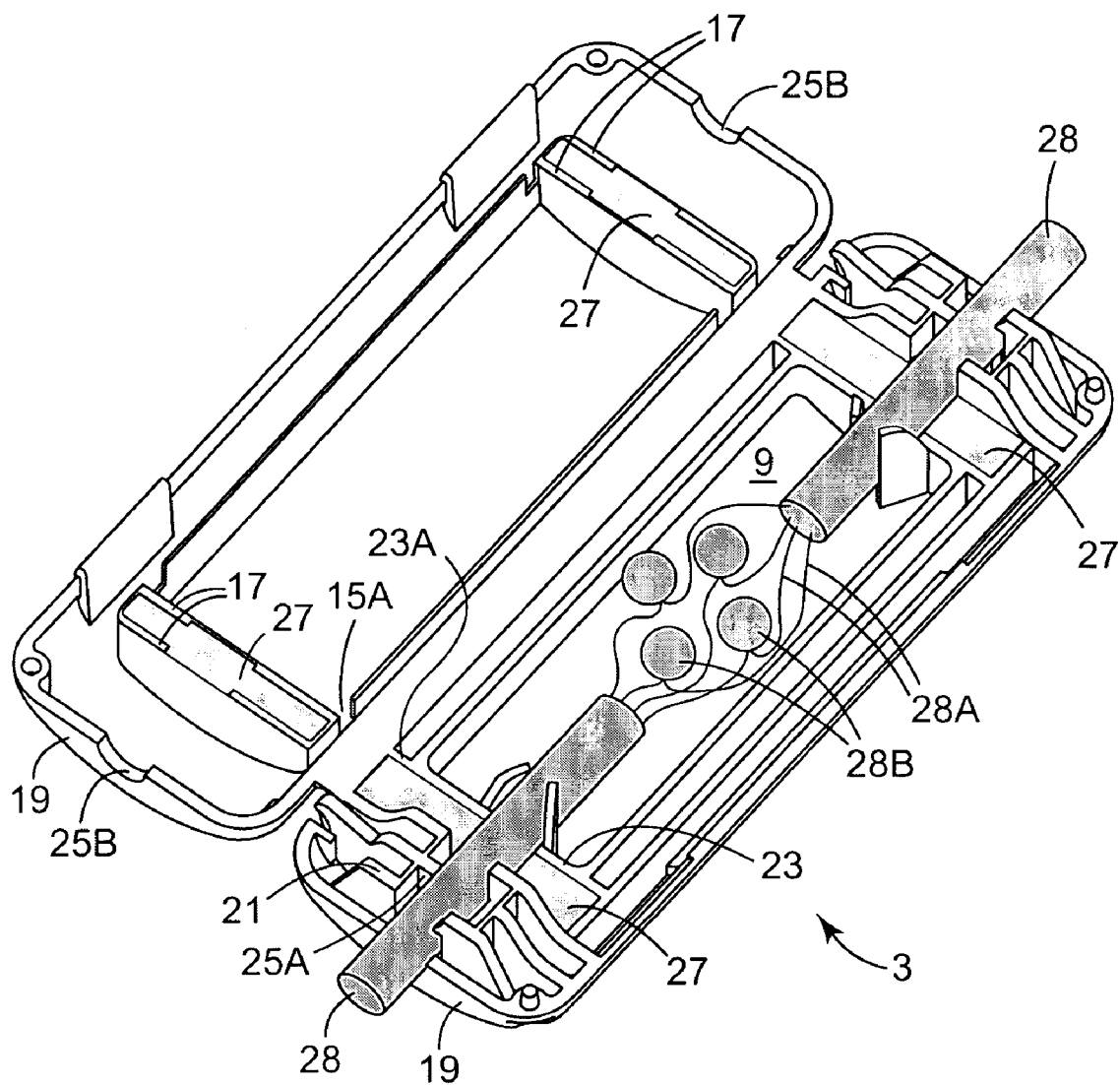
FIG. 6 shows the splice enclosure of FIG. 4 in an open condition and ready to be closed around a cable splice.

It will further be appreciated that a splice enclosure of the same general type as those illustrated in the drawings could be used to protect a so-called "pig tail", or butt, splice (i.e. a splice between cables that extend generally from the same direction, rather than from opposite directions as shown in FIG. 6). In that case, the splice enclosure (including the strain-relief structures 21) would require modification to permit the cables to enter the enclosure generally from the same direction, rather than from opposite directions as illustrated in the drawings.

Further modification of the cable entry paths of any of the splice enclosures described above with reference to the drawings would enable protection to be provided for splices between different numbers of cables, for example a longitudinal splice between one cable extending from one direction and two cables extending from the other direction.

The invention claimed is:

1. A re-enterable enclosure for a splice between cables, the enclosure comprising:
    first and second cover members releasably engageable with each other, wherein the cover members are joined to each other by at least one hinge, the first and second cover members being configured to form a cavity for enclosing the cable splice when the cover members are engaged with each other in a closed position, wherein the cavity for enclosing the cable splice is essentially free of sealant material, and including:
    (i) a plurality of internal walls in the first cover member configured to define a first containment space for containing sealant material, wherein the first containment space at least partly surrounds the cavity, and
    (ii) a plurality of internal walls in the second cover member, at least one of the plurality of internal walls configured to telescope into the first containment space in the first cover member when the cover members are engaged with each other in the closed position.

2. A splice enclosure as claimed in claim 1, further comprising a cable entry path into the cavity, and wherein said cable entry path traverses the first containment space.

3. A splice enclosure as claimed in claim 2, wherein the plurality of internal walls in the second cover member define a second containment space for containing sealant material.

4. A splice enclosure as claimed in claim 2, wherein at least one of the first and second cover members further comprises strain-relief members associated with said cable entry path.

5. A splice enclosure as claimed in claim 1, wherein the plurality of internal walls in the second cover member define a second containment space for containing sealant material, wherein the first and second containment spaces are configured such that the containment space in one of the first and second cover members can telescope into the containment space in the other one of the first and second cover members when the first and second cover members are engaged with each other in the closed position.

6. A splice enclosure as claimed in claim 5, further comprising a sealant material contained in the first and second containment spaces.

7. A splice enclosure as claimed in claim 6, wherein the first and second containment spaces all contain the same sealant material.

8. A splice enclosure as claimed in claim 1, further comprising a sealant material contained in the first containment space.

9. A splice enclosure as claimed in claim 8, wherein the first containment space contains a sealant material that has been poured into the first containment space and then cured.

10. A splice enclosure as claimed in claim 1, wherein the splice cavity is of elongate form, and the splice enclosure further comprises first and second cable entry paths into the cavity from opposed ends thereof.

11. A splice enclosure as claimed in claim 10, wherein the plurality of internal walls in at least one of the first and second cover members are configured to define transverse containment spaces at said opposed ends of the cavity, said transverse containment spaces oriented transverse to the elongate splice cavity.

12. A splice enclosure as claimed in claim 11, wherein the cable entry paths traverse said transverse containment spaces.

13. A splice enclosure as claimed in claim 12, wherein the transverse containment spaces are defined by the plurality of internal walls in both the first and second cover members.

14. A splice enclosure as claimed in claim 13, wherein the plurality of internal walls defining transverse containment spaces in one of the first and second cover members can telescope into transverse containment spaces in the other one of the first and second cover member when the cover members are engaged with each other in the closed position.

15. A splice enclosure as claimed in claim 11, wherein the plurality of internal walls in one of the first and second cover members are configured to provide longitudinal containment spaces that extend along both sides of the cavity between the opposed ends thereof.

16. A splice enclosure as claimed in claim 15, wherein the plurality of internal walls in the other one of the first and second cover members can telescope into the longitudinal containment spaces when the cover members are engaged with each other in the closed position.

17. A splice enclosure as claimed in claim 15, wherein none of the containment spaces are essentially free of sealant material.

18. A splice enclosure as claimed in claim 15, wherein the transverse containment spaces contain sealant material.

19. A splice enclosure as claimed in claim 18, wherein the longitudinal containment spaces contain sealant material.

20. A splice enclosure as claimed in claim 1, wherein the cover members are molded components.

* * * * *